Feb. 6, 1962 J. B. BRENNAN ET AL 3,019,666
TRANSMISSION SHIFT PATTERN GENERATOR
Filed Jan. 26, 1959 2 Sheets-Sheet 1
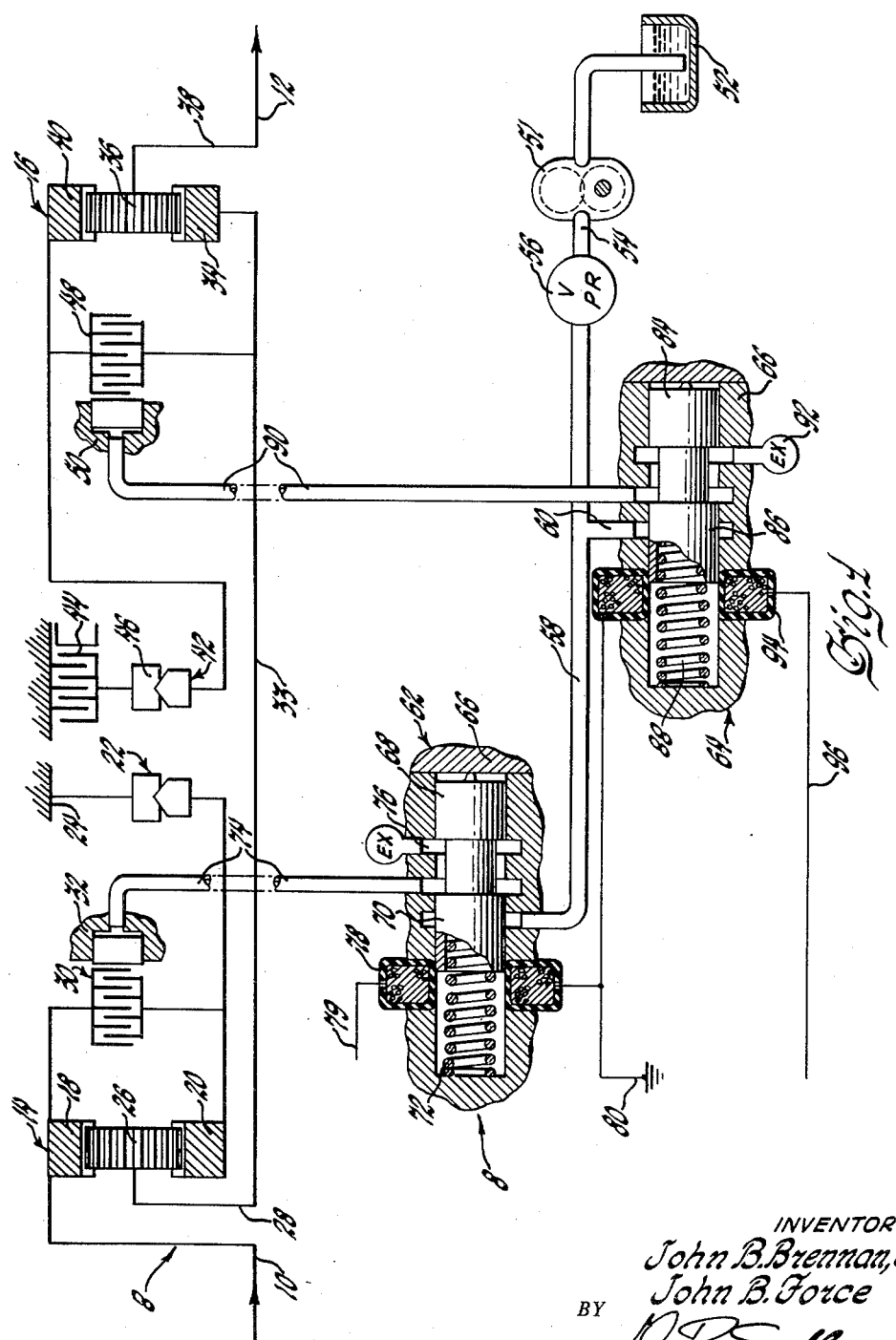
INVENTORS
John B. Brennan, &
John B. Force
BY
D. R. Sadler
ATTORNEY

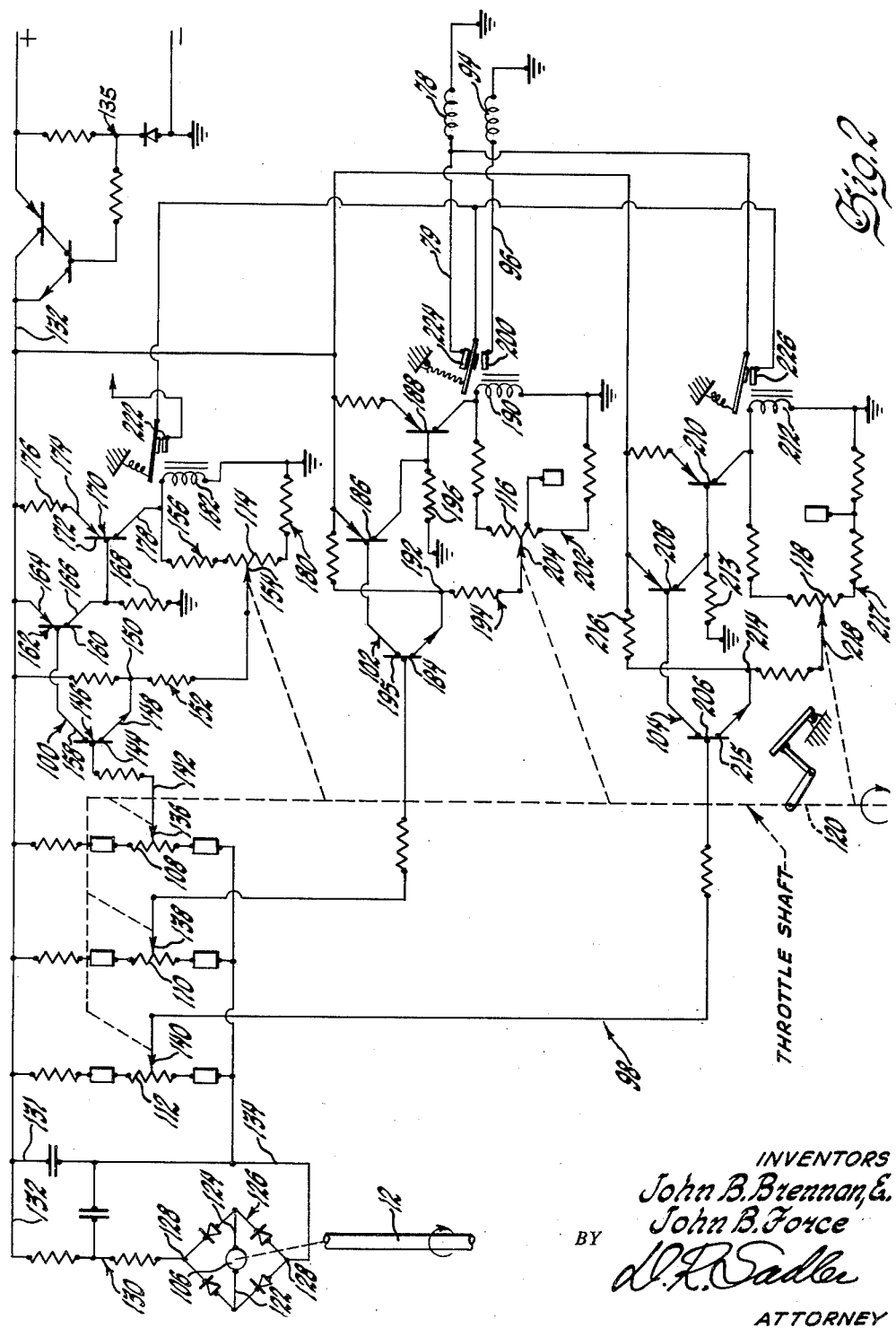

United States Patent Office 3,019,666
Patented Feb. 6, 1962

3,019,666
TRANSMISSION SHIFT PATTERN GENERATOR
John B. Brennan, Flint, and John B. Force, Bancroft, Mich., assignors to General Motors Corporation, Detroit, Mich., a corporation of Delaware
Filed Jan. 26, 1959, Ser. No. 788,912
10 Claims. (Cl. 74—472)

This invention relates to transmissions and particularly to combined electrical and hydraulic control systems therefor.

In automatic transmissions of the step ratio type, efforts are constantly being made to produce smooth and imperceptible transitions from one speed ratio to another. In one form of step ratio transmission, several sets of planetary gearing are provided wherein brakes and clutches are utilized to condition each gear set for different drives, usually, either a reduced drive or a direct drive. Ideally, the shifts through the transmission should follow a definite pattern determined by the drivers' desires and the torque characteristics of the particular vehicle engine being employed. To accomplish this with a hydraulic system, considerable valving is necessary with engine speed, vehicle speed, torque characteristics of the engine as well as those of the clutches and brakes, and torque demand being some of the factors to be considered in the design of the hydraulic control system. Furthermore, the complexity of such a hydraulic system increases with the number of shift points needed and the smoothness required of each shift.

With the foregoing in mind, the invention contemplates a simplified electrical control system that is effective to determine the desired gear ratio of the transmission and to actuate suitable hydraulic means for changing the gear ratios according to a predetermined scheme or pattern. More particularly, the electrical control system employs a tachometer that is driven in proportion to vehicle speed and is effective to generate a voltage indicative thereof. In addition, various potentiometers are provided that are actuated in accordance with the setting of the throttle valve and together with the tachometer so as to produce an electrical signal that is indicative of the vehicle speed and throttle setting. This electrical signal is then supplied to a group of trigger circuits interconnected with suitable relays. These relays control electrohydraulic means that, in turn, are effective to actuate the clutches and brakes for obtaining the required gear ratio.

Each trigger circuit comprises a plurality of transistors that are cascaded with each other to act as a switch. The input transistor receives the speed throttle signal and is conductive if the level of the signal is less than some predetermined amount. At the same time the output transistor, which controls a suitable control relay in the hydraulic portion of the system, is cut-off or non-conducting. However, if the present level is exceeded by the signal, the input transistor will be cut-off and the output transistor will become conductive and energize the control relay and thereby upshift the transmission to a higher speed ratio. If the signal subsequently falls below another preset level, the control relay will be de-energized and the transmission will be downshifted into a lower speed ratio.

The upshift and downshift points for each trigger circuit can be individually adjusted by various parameters in the circuits so that the various upshifts and downshifts from one gear ratio to another will occur at the correct time to provide the desired shift pattern to produce the desired operational characteristics to the vehicle and transmission.

It may thus be seen that an electronic shift pattern generator has been provided that will insure the proper operation and shifting of a step ratio. These and other features will become more apparent from the specification and drawings wherein:

FIGURE 1 shows schematically a transmission and the hydraulic controls therefor arranged to demonstrate the invention.

FIGURE 2 illustrates an electrical network for controlling the transmission hydraulic system.

Referring to the drawings in more detail and particularly to FIGURE 1 a transmission 8 is provided that has a driving shaft 10 which is adapted to be operatively interconnected with the crankshaft of a vehicle engine, not shown, and a driven shaft 12 adapted to be operatively interconnected with the driveshaft of the vehicle for rotatably driving the road wheels, etc. of the vehicle. The gear ratio of the transmission is determined by the condition of a front planetary gear unit 14 and a rear planetary gear unit 16 that interconnect the shafts 10 and 12 and cooperate to provide four forward drive ratios therebetween.

The front planetary gear unit 14 has an input ring gear 18 connected to the driving shaft 10 and a reaction sun gear 20 restrained from reverse rotation by a one-way device which is grounded at 24. The one-way device 22 may be of any known construction utilizing sprays, rollers, or the like, to prevent relative rotation between two members in one direction and allow free relative rotation therebetween in the opposite direction. Intermeshing with the ring and sun gears 18 and 20 are a series of planet pinions 26 journaled on a carrier 28.

With the sun gear 20 prevented from reverse rotation, the forwardly rotated ring gear 18 will revolve the carrier 28 in the same forward direction but at a reduced speed. Direct drive through the gear unit 14 is afforded by a clutch 30 positioned between the ring and sun gears 18 and 20. The clutch 30 may be of any conventional structure, such as the multi-disk type illustrated, and engaged by a hydraulically operated servo motor 32. When the clutch 30 is engaged, the ring and sun gears 18 and 20 are caused to revolve together and, as a result, the unit 14 locks up with the carrier 28 being rotated at the same speed as the input ring gear 18.

The front unit 14 is connected to the rear planetary gear unit 16 by means of a connection 33 that extends from the front unit carrier 28 to an input sun gear 34 for the rear unit 16. Sun gear 34 meshes with a series of planet pinions 36 journaled on a rear unit carrier 38 which, in turn, is connected to the driven shaft 12. Pinions 36 also mesh with a reaction ring gear 40 that is prevented from reverse rotation by means of the combined action of a one-way device 42 and a neutral brake 44 that holds an outer race 46 for the one-way device. The one-way device 42 is similar to the front unit one-way device 22 and likewise allows the reaction ring gear 40 to revolve forwardly unrestrained.

Consequently, when the input sun gear 34 is driven forwardly, neutral brake 44 and the one-way device 42 will prevent the reaction ring gear 40 from rotating backwards and cause the output carrier 38 to drive the driven shaft 12 forwardly at a reduced speed. A clutch 48 like the front unit clutch 30 is interposed between the sun and ring gears 34 and 40 and is operated by a hydraulic servo motor 50. When the clutch 48 is engaged by the motor 50, direct drive is established between the input sun gear 34 and the output carrier 38, since the sun and ring gears 34 and 40 are tied together, thereby preventing relative rotation of the gears.

Neutral and the four forward drive ratios through the transmission are obtained as follows: In neutral the front and rear unit clutches 30 and 48 and the neutral brake 44 are all disengaged. Since the sun gear 20 is prevented from revolving backwards by the front unit one-way device 22, the front unit 14 will transfer drive to the rear unit 16 when the driving shaft 10 is revolved. However, since the neutral brake 44 removes reaction for the rear unit ring gear 40, the rear unit 16 cannot transfer drive from the front unit 14 to the driven shaft 12. Therefore, disengagement of the neutral brake 44 will prevent the transmission of power to the drive shaft 12.

To initiate drive in the first gear ratio available, the neutral brake 44 is engaged. Under these circumstances the planet pinions 26 in the front unit 14 will drive carrier 28 at a reduced speed. This, in turn, will rotate the sun gear 34 in the rear unit 16 and drive output carrier 38. Thus the driven shaft 12 will be driven at a speed determined by the combined ratios afforded by the front and rear units 14 and 16.

In second gear ratio the front unit clutch 30 is engaged locking up the front unit 14 and, consequently, carrier 28 will then rotate with the drive shaft 10. The sun gear 34 will then drive carrier 38 at a reduced speed. Thus, the shaft 12 revolves at a rate determined entirely by the ratio provided in the rear unit 16.

In order to obtain the third gear ratio, the front clutch 30 is disengaged and the rear clutch 48 is engaged. Under these conditions, the rear unit 16 is locked up and carrier 38 will rotate at the same speed as sun gear 34. However, since the ring gear 18 and sun gear 20 in the front unit 14 can rotate relative to each other, the driven shaft 12 will be driven at a speed determined by the front unit 14.

In obtaining the fourth gear ratio, the front clutch 30 and the rear clutch 48 are both engaged, thereby locking up both the front and rear units 14 and 16. When thus combined they will provide a direct drive between the driving and driven shafts 10 and 12.

Pressure fluid for operating the front and rear unit servo motors 32 and 50 is derived from a pump 51, preferably driven by the engine. The pump 51 draws fluid from a sump 52 and discharges into a main supply line 54 in which is located a conventional pressure regulating valve 56 so as to maintain the pressure in the system substantially constant. Communicating with the main supply passage 54 are branch lines 58 and 60 leading, respectively, to a front unit shift valve 62 and a rear unit shift valve 64, both of which are housed within bores in a valve body 66.

The front unit shift valve 62 is of the spool type comprising spaced lands 68 and 70 and is biased to the depicted position by a spring 72. In this position, the lands 68 and 70 establish communication between a front unit servo supply line 74 and an exhaust port 76, thus draining the front unit servo motor 32 and disengaging the front unit clutch 30. To move the valve 62 to the left, a relay 78 is utilized, the winding of which is grounded at 80 and is energized from conductor 79. When the relay 78 is energized as will be explained, the valve 62 is drawn to the left so as to re-position the lands 68 and 70. In the new position communication between branch supply line 58 and the front unit servo supply line 74 is permitted by the lands 68 and 70 and the exhaust port 76 is closed by land 68. With the valve 62 in this latter position, the front unit clutch 30 will be engaged by pressure fluid supplied to the servo motor 32.

As illustrated, the rear unit shift valve 64 is similar to the front unit shift valve 62 and includes spaced lands 84 and 86. Also, the valve 64 is biased to the viewed position by a spring 88 in which position a rear unit servo supply line 90 is opened to an exhaust port 92 by the lands 84 and 86 and the clutch 48 is maintained disengaged. The valve 64 is shifted to the left by a relay 94 which is grounded at 80 and energized from conductor 96. When shifted to the left, the lands 84 and 86 open branch supply line 60 to the rear unit servo supply line 90 and the land 84 closes exhaust port 92. With lines 60 and 90 communicating in this manner, the rear unit clutch 48 is engaged by the hydraulic actuation of the rear unit servo 50.

The electrical network 98 for energizing conductors 79 and 96 and thereby controlling the opening and closing of the valves 62 and 64 is illustrated in FIGURE 2. This network 98 includes a 1–2 shift circuit 100, a 2–3 shift circuit 102 and a 3–4 shift circuit 104 which are effective to act as trigger circuits or electronic switches for controlling the up and down shifting between the first and second gear ratios, the second and third gear ratios and the third and fourth gear ratios, respectively.

The signal for actuating these circuits is derived from a tachometer 106 driven from the output shaft 12 and a group of upshift potentiometers 108, 110 and 112 and a group of downshift potentiometers 114, 116 and 118 which are actuated by movement of the engine throttle valve shaft 120.

Since the tachometer 106 is driven from the output shaft 12, it will generate a voltage indicative of the vehicle speed. The output terminals 122 and 124 of the tachometer 106 are connected to the diagonally opposite corners of a bridge type rectifier 126 while the conjugate corners 128 thereof are connected to a resistive capacitive pi-filter 130. The positive side 131 of the filter 130 is connected to a regulated positive supply voltage line 132 incorporating a voltage regulator of any suitable construction such as that denoted at 135 while the negative side 134 is connected across the lower ends of the three upshift potentiometers 108, 110 and 112. It may thus be seen that the upper ends of the potentiometers 108, 110 and 112 will be held at a constant positive potential and the lower ends thereof will be driven more negative with increases in speed.

Each of the potentiometers 108, 110 and 112 may be mounted on the carburetor with the center taps 136, 138, 140 mechanically interconnected with the throttle shaft 120 so that the positions of the center taps 136, 138 and 140 relative to the positive ends will be indicative of the position of the throttle valve. Preferably, the center taps are arranged to be at the positive or upper end of the potentiometers when the throttle is open and at the bottom or negative end when the throttle valve is closed.

It may thus be seen that since the potential of the upper ends of the potentiometers 108, 110 and 112 is held constant at supply line voltage and that the lower ends of the potentiometers vary negatively with speed, movements of the center taps 136, 138 and 140 with the throttle valve will produce three separate signals that represent various functions of the vehicle speed and throttle valve setting. Moreover, since the increases in voltage from the tachometer 106 as a result of increases in speed will be opposed by the opening of the throttle valve, by a proper choice of the various parameters such as the resistances, mechanical drives, etc., each of these signals may be made to reach certain levels when it is desired to vary the speed ratio of the transmission 8.

In order to utilize these signals for energizing the relay coils 78 and 94 and setting the desired gear ratio, each of the shift circuits 100, 102 and 104 are connected to one of the center taps 136, 138 or 140.

The 1–2 shift circuit 100 controls the upshifting of the transmission 8 from the first gear ratio to the second gear ratio and the downshifting from the second gear ratio to the first gear ratio. The input to this circuit 100 includes a conductor 142 that leads from the center tap 136 of the 1–2 potentiometer 108 to the base 144 of a first transistor 146. The emitter 148 of this transistor 146 is connected to the midpoint 150 of a voltage divider 152 that extends from the supply line voltage to a center tap 154 of the 2–1 downshift potentiometer 114 in a second voltage divider 156. The collector 158 of the transistor 146 is connected to the base 160 of a second transistor 162 having the emitter 164 connected to supply line voltage and the collector 166 grounded through a biasing resistor 168. It may thus be seen that the conduction of the first transistor 146 and consequently, the collector current from the second transistor 162 will be controlled by the potential difference between the center tap 136 of the 1–2 potentiometer and the midpoint 150 in the voltage divider 152.

A third transistor 170 is provided that has the base 172 thereof tied to the positive end of the biasing resistor 168 while the emitter 174 thereof is connected to a resistor 176 leading to the supply voltage. The collector 178 is, in turn, connected to one end of a circuit 180 containing the second voltage divider 156 and a first control relay 182 in parallel therewith. When the potential of tap 136 is more positive than that of midpoint 150, the first and second transistors 146 and 162 will conduct and the current through the biasing resistor 168 will raise the base 144 potential sufficiently positive to prevent conduction in the third transistor 170. However, as the potential of the center tap 136 approaches the potential of the midpoint 150 of the voltage divider 152, the first and second transistors 146 and 162 will become less conductive and there will be less drop across the biasing resistor 168. When the potential difference between the center tap 136 and the midpoint 150 approaches zero, the first and second transistors 146 and 162 will cut-off and there will be no drop across the biasing resistor 168 due to current flow through transistor 162. As a result, the third transistor 170 will no longer be biased beyond cut-off and will become conductive. When this occurs the current through the collector 178 will then raise the potential across the second voltage divider 156 and will also energize the first control relay 182. This positive increase in the potential across the divider 156 will increase the potential of the center tap 154 and will thus be fed back to the first voltage divider 152 and increase the potential of the midpoint 150 in a positive direction. This will insure a quick and positive cut-off of the first and second transistors 146 and 162 and a more rapid increase in the current from the collector 178 in the third transistor 170. At the same time the increase of the midpoint 150 potential will materially reduce the potential difference required to cause the first and second transistors 146 and 162 to become conductive. As a result, the tachometer 106 output and/or the position of the center tap 136 will have to substantially decrease the potential on the base 144 of the transistor 146 below the cut-off point to re-establish conduction. The point at which conduction will reoccur is determined by the amount of positive increase in the potential of the lower end of the divider 152. This amount, in turn, is determined by the parameters of the divider 156 and the position of the center tap 154 in the 2–1 potentiometer 114 and can thus be made to correspond to the point at which it is desirable to downshift from the second gear ratio to the first gear ratio. It should be noted that when transistor 170 is not conducting, the potential across the circuit 180 will be very low. As a result, the values of the resistances, etc. therein will have little, if any, effect on the potential of the midpoint 150 as long as transistor 170 is cut-off.

The 2–3 circuit 102 controls the upshifting of the gear ratio from the second gear to the third gear ratio and the downshifting from the third gear ratio to the second gear ratio. This circuit 102 is similar to the first circuit 100 in that it includes three transistors 184, 186 and 188 that are cascaded with each other to act as an electronic switch for actuating the second control relay 190. The conduction in the first and second transistors 184 and 186 is controlled by the difference between the midpoint 192 of the voltage divider 194 and the base 195 which is connected to the center tap 138 of the 2–3 potentiometer 110. When these two transistors 184 and 186 are conducting the current flow through the biasing resistor 196 will bias the third transistor 188 beyond cut-off and the second control relay 190 will be de-energized. However, when the potential of the center tap 138 becomes sufficiently negative to prevent the first and second transistors 184 and 186 from conducting, the potential drop across the biasing resistor 196 will disappear and the third transistor 188 will become conductive. Such conduction will cause the control relay 190 to close the contacts 200, and also raise the drop across the circuit 202. This, in turn, will raise the potential of the center tap 204 and thereby raise the potential of the midpoint 192 in the voltage divider 194 in a positive direction relative to the center tap 138 and thereby produce a corresponding difference between the cut-off and conduction points for the first and second transistors 184 and 186. The point at which the upshift will occur will be determined by the relative values of the resistances of the potentiometer 110, the voltage divider 194, etc., whereas the point at which the downshift will occur will be determined by the relative values of the resistances in the circuit 202, the position of the center tap 204, etc.

The 3–4 circuit 104 controls the upshifting of the gear ratio from the second gear to the third gear ratio and the downshifting from the fourth gear ratio to third gear ratio. This circuit 104 is similar to the 1–2 and 2–3 circuits 100 and 102 in that it also includes three transistors 206, 208 and 210 that perform a switching action for actuating a third control relay 212. The conduction of the first and second transistors 206 and 208 is controlled by the relative potential between the midpoint 214 of voltage divider 216 and the base 215 which is connected to the center tap 140 in the 3–4 potentiometer 112. When the first and second transistors 206 and 208 of this circuit 104 are conducting the third transistor 210 will not conduct due to the drop across the biasing resistor 213 and the control relay 212 will be de-energized. If the first and second transistors 206 and 208 are cut-off by the potential of the center tap 140 of the 3–4 potentiometer 112 becoming equal to or more negative than the midpoint 214 of the divider 216, the voltage drop across the biasing resistor 213 will disappear and the third transistor 210 will be conductive and the control relay 212 will be energized. This will also cause the center tap 218 of the 4–3 potentiometer 118 to become more positive and thereby raise the potential of the midpoint 214 of the voltage divider 216.

It may thus be seen that as the speed of the vehicle increases, the voltage from the tachometer 106 will increase. Since the upper ends of the potentiometers 112, 114 and 116 will be held constant at line 132 voltage, the lower ends thereof will be driven progressively more negative. This will cause the potentials of the center taps 136, 138 and 140 of the 1–2, 2–3 and 3–4 potentiometers 108, 110 and 112 to become progressively more negative. However, the amount of these increases will be determined by the position of the throttle valve ergo the positions of the center taps 136, 138 and 140. If the speed of the vehicle increases and/or the throttle valve closes far enough, the potential of the center tap 136 will approach the potential of the midpoint 150 of the divider 152. The transistors 146 and 162 will then become less conductive and the voltage drop across the biasing resistor 168 will decrease until the third transistor 170 tends to become conductive and permits an increase in the flow of current through the divider 156. This will raise the potential of the center tap 154 and thereby raise the potential of the midpoint 150 relative to the center tap 136. As a result, the first and second transistors will instantly cease conducting. In addition, the current from the transistor 170 will energize the relay 182 and close contacts 222.

The point at which the foregoing occurs is controlled by the voltage from the tachometer 106, the position of the center tap 136 in the 1–2 potentiometer 108 and the proportions of the resistors in the voltage divider 152 and the resistance in the potentiometer 108. By a proper proportioning of these parameters, the point at which conduction in the first and second transistors 146 and 162 ceases can be made to occur at the point where it is desired to cause an upshift from the first gear ratio to the second gear ratio. When the contacts 222 close a power source may be connected to the normally closed contacts 224. This will apply the power voltage to conductor 79 leading to the relay 78.

Energizing relay coil 78 will pull the spindle 70 to the left and apply hydraulic fluid at full line pressure to the servo motor 32 and engage the clutch 30. This will cause the ring and sun gears 18 and 20 to rotate together. Since the values of the circuit are chosen to cause the switching action to occur in the 1–2 circuit 100 before the switching action occurs in the 2–3 and 3–4 circuits 102 and 104, control relays 190 and 212 will be deenergized and therefore coil 94 will not be energized. Consequently, input shaft 10 will drive directly through the front unit 14 to carrier shaft 33 which, in turn, will drive the sun gear 34 in the rear unit 16. As a result of the closing of the valve 64, the ring and sun gears 40 and 34 are free to rotate relative to each other and the rear unit 16 will cause a speed reduction corresponding to the second gear ratio.

If the speed of the vehicle continues to increase and/or the throttle valve closes, the voltage from the tachometer and the position of the center tap 138 in the 2–3 potentiometer 110 will be such that the potential on the base 195 of the input transistor 184 in the 2–3 circuit 102 will be equal to the potential of the midpoint 192 in the voltage divider 194. The various parameters of the circuit 102, such as the resistances in the voltage divider 194 and the 2–3 potentiometer 110, are such that this equilibrium will occur at the point at which it is desired to upshift from the second gear ratio to the third gear ratio. This point will thus occur after the point at which the switching action in the 1–2 circuit 100 occurs. As this balance point is approached, the collector current from the first transistor 184 will decrease and thereby reduce the current in the second transistor 186. Thus, the voltage drop across the biasing resistor 196 will decrease and allow the third transistor 188 to become conductive. Conduction through the third transistor 188 will increase the voltage across the circuit 202 so that the midpoint 192 of divider 194 will become more positive thereby causing the first and second transistors 184 and 186 to be quickly and completely cut-off even though the potential of the center tap 138 remains substantially constant or even becomes slightly more negative. At the same time the current from the collector of transistor 188 will energize the second control relay 190 and move the armature so as to open contacts 224 and close contacts 200. This will remove the power voltage from coil 78 and apply it to coil 94. This, in turn, will cause valve 62 to close and free the ring and sun gears 18 and 20 in the front unit 14 and to open valve 64 and thereby cause engagement of clutch 48. As a result, the rear unit 16 will be locked up into direct drive and the front unit 14 will produce a speed reduction corresponding to the third gear ratio.

In the event the speed of the vehicle still continues to increase and/or the throttle valve closes, the voltage from the tachometer 106 and the position of the center tap 140 in the 3–4 potentiometer 112 will be such that the potential on the base 215 of the input transistor 206 in the 3–4 circuit 104 will be equal to the potential of the midpoint 214 in the voltage divider 216. The various parameters of this circuit 104 are such that this balance point will occur at the point at which it is desired to upshift to the fourth gear ratio or direct drive through the transmission and will thus occur subsequent to the 1–2 and 2–3 shift points. As the balanced condition is approached the current through the biasing resistor 213 will decrease. The voltage thereacross will also decrease until the first two transistors 206 and 208 are cut-off and the third transistor 210 becomes conductive. The collector current from transistor 210 will thus raise the voltage across the circuit 217. This increase will be reflected at the midpoint 214 by increasing the potential thereof in a positive direction. Thus, there will be a rapid and complete cut-off of the first and second transistors 206 and 208 even though the potential of the base 215 remains constant or even becomes somewhat more negative. At the same time the relay 212 will be energized and close the contacts 226 therein. This will thereby reapply the power voltage to the coil 78 and then pull the spindle 70 to the left to thus engage clutch 30 and lock up the front unit 14 in direct drive. Since the rear unit 16 was previously in direct drive, the entire transmission will provide a direct drive from the input shaft 10 to the output shaft 12.

As long as the speed of the vehicle is adequate and the throttle valve is sufficiently closed, all three of the control relays 182, 190 and 212 will remain energized and the transmission 8 will remain in direct drive. However, if the vehicle speed decreases and/or the throttle is opened, the potential on the center tap 140 of the 3–4 potentiometer 112 will become more positive and approach the potential of the midpoint 214. The potential of this point 214 will not only be determined by the voltage drops across the resistors in the divider 216, but also by the position of the center tap 218 in the potentiometer 118 which, in turn, is controlled by the carburetor throttle valve. When the midpoint 214 and the center tap 140 have equal potentials, the input transistor 206 will commence conducting. This will produce a corresponding increase in the current in the second transistor 208 with a resultant increase in the voltage drop across the biasing resistor 213. The third transistor 210 will then be cut-off and produce a corresponding decrease across the circuit 217. This will be reflected at the midpoint 214 by lowering the potential thereof to the level it was before the 3–4 upshift occurred. As a result, the current in the first and second transistors 206 and 208 will rapidly build up and the third transistor 210 will be completely cut-off.

When the collector current from the transistor 210 stops, the control relay 212 will be de-energized and the armature released. The contacts 226 will then open and thereby de-energize the coil 78 and permit the valve 62 to close. As a result, the front unit 14 will no longer be locked up but instead will provide a speed reduction corresponding to the third gear ratio.

It should be noted that the point at which the 4–3 downshift occurs may be made considerably different than the point at which the 3–4 upshift occurs due to the feedback resulting from the fluctuations in the collector current of the third transistor 210 through the circuit 217. When the third transistor 210 is not conducting, which is the condition existing prior to the 3–4 upshift, the voltage drop across the circuit 214 will be small. As a result, the voltage at the midpoint 214 will be determined primarily by the ratio of the resistances in the divider 216 provided the emitter current from the transistor 206 is negligible compared to the normal current flowing through the divider 216. Thus, although the center tap 218 in the 4–3 potentiometer 118 will move with the center tap 140 in the 3–4 potentiometer 112, the effects of such movement will be negligible on the potential at the midpoint 214 and can be ignored provided the third transistor 210 is not conducting.

However, in the event the third transistor 210 is conducting, the current from the collector thereof will increase the voltage drop across the circuit 217 to a level where it will be significant compared to the voltage drop across the divider 216. Accordingly, the voltage of the midpoint 214 will be materially affected by the position of the center tap 218 in the 4–3 potentiometer 118.

It is therefore apparent that, by a proper choice of the various resistances in the collector circuit 217, the movement of the center tap 218 can be effective to modify the potential of the midpoint 214 when the transmission is in fourth gear to cause the 4–3 downshift to occur at the desired point even though this point is located considerably below the 3–4 upshift.

If the speed of the vehicle decreases further and/or the throttle valve is opened further, the potential of the center tap 138 will become progressively more positive and will approach the potential of the midpoint 192 in the divider 194. When these two potentials become equal, the transistors 184 and 186 will become conductive and thereby cause a voltage drop to appear across the biasing resistor 196. This voltage drop will cause the third transistor 188 to be cut-off and thereby reduce the current flow through the relay coil 190 and the circuit 202. This will reduce the voltage across the potentiometer 116. Thus, the midpoint 192 will become more negative and have the same potential it had before the 2–3 upshift occurred. As a result, of this change the potential of the center tap 138 will be much more positive than the midpoint 192 and the current in the first and second transistors 184 and 186 will rapidly increase and a third transistor 188 will rapidly be completely cut-off.

When the collector current from the transistor 188 stops, the control relay 190 will be de-energized and thereby release the armature. The contacts 200 will then open and contacts 224 will close. This will then remove the power voltage from relay 94 and apply it to relay 78. As a result, valve 62 will open and cause the clutch 30 to lock up the sun and ring gears 34 and 40 in the front unit 14 into direct drive. Also, valve 64 will open and release the clutch 48 and thereby permit relative rotation between the sun and ring gears 34 and 40 in the rear unit 16. Thus the front unit 14 will provide a direct drive but the rear unit 16 will provide a speed reduction so that the transmission 8 will have an over-all gear ratio corresponding to the second gear ratio.

In the event the speed of the vehicle continues to decrease and/or the throttle valve continues to open, the variations in the voltage from the tachometer 106, the movement of center tap 136 and the movement of center tap 154 will cause the potential on the center tap 136 of the 1–2 potentiometer to eventually become more positive than the midpoint 150 of the divider 152. The transistors 146 and 162 in the 1–2 circuit 100 will then commence conducting and thereby produce a corresponding voltage drop across the biasing resistor 168. This will cause the third transistor 170 to be cut-off and produce a decrease in the current through the divider 156. This will be reflected at the midpoint 150 by lowering the potential thereof considerably more negative than the center tap 136 and to the level it was at before the 1–2 upshift occurred. As a result, the current in the first and second transistors 146 and 162 will rapidly build up and the third transistor 170 will be completely cut-off. When the current from the collector 178 stops, the control relay 182 will be de-energized and the contacts 222 will open. The coil 78 will then be de-energized and the valve 62 closed. As a result, the front and rear units 14 and 16 will no longer be locked up, but instead, both of them will provide a speed reduction which will correspond to the first gear ratio.

What is claimed is:

1. In a vehicle having a throttle controlled engine and a transmission for coupling said engine to a load, a control system comprising electrical generating means for producing a voltage indicative of vehicle speed, at least one voltage dividing means disposed across said generating means, said dividing means being mechanically actuated by said throttle for providing a voltage signal that is a function of vehicle speed and throttle setting, gear ratio changing means for varying the over-all gear ratio through said transmission, switch means connected with said voltage dividing means and said gear ratio means so as to be responsive to said signal for actuating said gear ratio changing means whenever said voltage signal is some predetermined amount, and means actuated by movement of said throttle to vary said predetermined amount as a function of said movement.

2. In a vehicle having a throttle controlled engine and a transmission for coupling said engine to a load, a control system for actuating said transmission comprising electrical generating means for producing a voltage which is a function of the speed of said vehicle, at least one potentiometer electrically connected across said generating means and operated by the throttle for providing a voltage representative of throttle position and vehicle speed, gear ratio changing means for varying the drive through said transmission, electronic switch means connected to the center tap of said potentiometer to be responsive to said voltage for upshifting said transmission into a lower gear ratio whenever said voltage becomes equal to a first switching potential, said switching means also being adapted to downshift said transmisison into a higher gear ratio whenever said voltage is equal to a second switching potential, means actuated in response to movement of said throttle for varying the amount of at least one of said switching potentials.

3. In a vehicle having a throttle controlled engine and a transmission with a plurality of gear ratios for coupling said engine to a load, a control system comprising an electrical generator for producing a voltage indicative of vehicle speed, a separate switching circuit for each pair of adjacent gear ratios, a potentiometer for each of said switching circuits electrically connected across said generator, each of the center taps thereof being mechanically actuated by the throttle to provide voltage signals representative of throttle position and vehicle speed and being electrically connected to an input to one of said switch circuits, gear ratio changing means for varying the over-all gear ratio through said transmission, each of said switch circuits being adapted to actuate said ratio changing means whenever its voltage signal is a predetermined amount to change said gear ratio.

4. In a vehicle having a throttle controlled engine and a transmission with a plurality of gear ratios for coupling said engine to a load, a control system comprising an electrical generator for producing a voltage indicative of vehicle speed, a separate switching circuit for each pair of adjacent gear ratios, a potentiometer for each of said switching circuits electrically connected across said generator, each of the center taps thereof being mechanically actuated by the throttle to provide voltage signals representative of throttle position and vehicle speed and being electrically connected to an input to one of said switch circuits, gear ratio changing means for varying the over-all gear ratio through said transmission, each of said switch circuits being adapted to actuate said ratio changing means for upshifting said transmission into the next lower gear ratio whenever the potential of its center tap reaches a predetermined amount, each of said switch circuits also being adapted to actuate said ratio changing means for downshifting said transmission into the next higher gear ratio whenever the potential of its center tap reaches another predetermined amount which is determined by the throttle position.

5. In a transmission control system for an engine driven vehicle, the combination of ratio changing means for varying the drive through the transmission, means producing a signal voltage corresponding both to engine torque demand and vehicle speed, switch means operatively connected to the signal voltage producing means, the switch means being so arranged as to control the operation of the ratio changing means in response to the signal voltage and cause a ratio change when the signal voltage is of a predetermined magnitude, and means altering the predetermined magnitude with engine torque demand.

6. In a transmission control system for an engine driven vehicle the combination of ratio changing means for varying the drive ratio through the transmission, means producing a signal voltage corresponding both to engine torque demand and vehicle speed, switch means operatively connected to the signal voltage producing means the switch means being so arranged as to control the operation of the ratio changing means in response to the signal voltage thereby causing the drive ratio to be changed when the signal voltage attains a predetermined proportion to a reference voltage, and feedback means altering the reference voltage during upshifting and downshifting of the transmission so that the transmission will upshift to a lower ratio from a higher ratio at one point and downshift from said lower ratio to said higher ratio at a different point.

7. In a transmission control system for an engine driven vehicle, the combination of ratio changing means for varying the drive ratio through the transmission, means producing a signal voltage corresponding both to engine torque demand and vehicle speed, electronic switch means operatively connected to the signal producing voltage means, the electronic switching means being so arranged as to control the operation of the ratio changing means in response to the signal voltage thereby causing the transmission to be upshifted and downshifted when the signal voltage bears a predetermined relationship to a reference voltage, and means varying the reference voltage so that upshifting and downshifting of the transmission occurs at different points.

8. In a transmission control system for an engine driven vehicle, the combination of ratio changing means for varying the drive ratio through the transmission, means producing a signal voltage corresponding both to engine torque demand and vehicle speed, an amplifying device including first and second stages, the first stage having the input thereof arranged so as to have the signal voltage applied thereto, the second stage having the output thereof operatively connected to the ratio changing means and impedance means connected in the output of the second stage and also connected in a degenerative sense in the input of the first stage whereby increased conduction in the second stage develops a voltage across said impedance that opposes the signal voltage so that the ratio changing means will cause the transmission to be upshifted from a high ratio to a low ratio at one point and downshifted from said low ratio to said high ratio at another point.

9. In a transmission control system for an engine driven vehicle, the combination of ratio changing means for varying the drive ratio through the transmission, means producing a signal voltage corresponding both to engine torque demand and vehicle speed, an amplifying device including first and second stages, the first stage having the input thereof arranged so as to have the signal voltage applied thereto, the second stage having the output thereof operatively connected to the ratio changing means, impedance means connected in the output of the second stage and also connected in a degenerative sense in the input of the first stage whereby increased conduction in the second stage develops a voltage across said impedance that opposes the signal voltage so that the ratio changing means will cause the transmission to be upshifted from a high ratio to a low ratio at one point and downshifted from said low ratio to said high ratio at another point, and means varying the impedance means with torque demand.

10. In a vehicle transmission control system for a throttle controlled engine, the combination of ratio changing means for varying the drive ratio through the transmission, means producing a signal voltage corresponding both to throttle position and vehicle speed, an amplifying device including first and second stages, the first stage having the input thereof arranged so as to have the signal voltage applied thereto, the second stage having the output thereof operatively connected to the ratio changing means, impedance means connected in the output of the second stage and also connected in a degenerative sense in the input of the first stage whereby increased conduction in the second stage develops a voltage across said impedance that opposes the signal voltage so that the ratio changing means will cause the transmission to be upshifted from a high ratio to a low ratio at one point and downshifted from said low ratio to said high ratio at another point, and means varying the impedance means with throttle position.

References Cited in the file of this patent

UNITED STATES PATENTS

| | | |
|---|---|---|
| 2,855,794 | Faisandier | Oct. 14, 1958 |
| 2,875,634 | Gelenius, et al. | Mar. 3, 1959 |
| 2,891,411 | Sutherland et al. | June 23, 1959 |

FOREIGN PATENTS

| | | |
|---|---|---|
| 1,102,758 | France | May 11, 1955 |

UNITED STATES PATENT OFFICE
CERTIFICATE OF CORRECTION

Patent No. 3,019,666 February 6, 1962

John B. Brennan et al.

It is hereby certified that error appears in the above numbered patent requiring correction and that the said Letters Patent should read as corrected below.

Column 1, line 56, for "present" read -- preset --; column 2, line 25, for "sprays" read -- sprags --.

Signed and sealed this 19th day of June 1962.

(SEAL)
Attest:

ERNEST W. SWIDER
Attesting Officer

DAVID L. LADD
Commissioner of Patents